US008407073B2

(12) United States Patent
Bagheri et al.

(10) Patent No.: US 8,407,073 B2
(45) Date of Patent: Mar. 26, 2013

(54) SCHEDULING RESOURCES FROM A MULTI-SKILL MULTI-LEVEL HUMAN RESOURCE POOL

(75) Inventors: Saeed Bagheri, Croton on Hudson, NY (US); Jarir K. Chaar, Tarrytown, NY (US); Yi-Min Chee, Yorktown Heights, NY (US); Daniel V. Oppenheim, Croton on Hudson, NY (US); Krishna C. Ratakonda, Yorktown Heights, NY (US); Nianjun Zhou, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 12/868,027

(22) Filed: Aug. 25, 2010

(65) Prior Publication Data

US 2012/0053977 A1    Mar. 1, 2012

(51) Int. Cl.
*G06Q 10/00* (2012.01)
(52) U.S. Cl. ............... 705/7.13; 705/7.11; 705/7.12; 705/7.14
(58) Field of Classification Search .......... 705/7.13, 705/7.11, 7.12, 7.14
See application file for complete search history.

(56) References Cited

U.S. PATENT DOCUMENTS

| 5,111,391 | A | * | 5/1992 | Fields et al. ............... 705/7.14 |
| 5,548,506 | A | | 8/1996 | Srinivasan |
| 5,729,749 | A | | 3/1998 | Ito |
| 5,835,898 | A | | 11/1998 | Borg et al. |
| 5,974,392 | A | | 10/1999 | Endo |
| 6,049,775 | A | | 4/2000 | Gertner et al. |
| 6,226,784 | B1 | | 5/2001 | Holmes et al. |
| 6,237,020 | B1 | | 5/2001 | Leymann et al. |
| 6,249,715 | B1 | * | 6/2001 | Yuri et al. ............... 700/111 |
| 6,286,104 | B1 | | 9/2001 | Buhle et al. |
| 6,405,364 | B1 | | 6/2002 | Bowman-Amuah |
| 6,516,451 | B1 | | 2/2003 | Patin |
| 6,519,763 | B1 | | 2/2003 | Kaufer et al. |
| 6,550,057 | B1 | | 4/2003 | Bowman-Amuah |
| 6,601,233 | B1 | | 7/2003 | Underwood |
| 6,601,234 | B1 | | 7/2003 | Bowman-Amuah |
| 6,662,357 | B1 | | 12/2003 | Bowman-Amuah |

(Continued)

OTHER PUBLICATIONS

Product development resource allocation with foresight, Nitin R. Joglekar, David N. Ford, European Journal of Operation Research, European Journal of Operational Research, vol. 160, Issue 1, Jan. 1, 2005, pp. 72-87.*

(Continued)

*Primary Examiner* — Peter Choi
*Assistant Examiner* — Darlene Garcia-Guerra
(74) *Attorney, Agent, or Firm* — John R. Pivnichny; Law Office of Jim Boice

(57) ABSTRACT

Each work item from a group of work items is categorized as either complex or intense, and a unique work requirement statement is derived for each work item based on whether it is complex or intense. A unique resource value statement is assigned to different human resources. Past performances of the human resources are analyzed against completed work items in order to adjust the unique resource value statement, thus creating updated human resource value statements. An optimized work requirement statement is created by recalculating the unique work requirement statement for each work item based on the updated human resource value statements. A schedule for automated allocation of human resources to functional areas of an enterprise activity environment and scheduling of work items to the functional areas is formulated based on the optimized requirement statement for each work item in the group of work items.

18 Claims, 8 Drawing Sheets

U.S. PATENT DOCUMENTS

| | | | |
|---|---|---|---|
| 6,718,535 B1 | 4/2004 | Underwood | |
| 6,789,254 B2 | 9/2004 | Broussard | |
| 6,854,107 B2 | 2/2005 | Green et al. | |
| 6,931,621 B2 | 8/2005 | Green et al. | |
| 6,964,034 B1 | 11/2005 | Snow | |
| 6,970,829 B1* | 11/2005 | Leamon | 705/7.14 |
| 6,973,176 B1 | 12/2005 | Chism et al. | |
| 7,035,809 B2 | 4/2006 | Miller et al. | |
| 7,051,036 B2 | 5/2006 | Rosnow et al. | |
| 7,062,449 B1 | 6/2006 | Clark | |
| 7,137,100 B2 | 11/2006 | Iborra et al. | |
| 7,139,999 B2 | 11/2006 | Bowman-Amuah | |
| 7,155,400 B1 | 12/2006 | Jilk et al. | |
| 7,159,206 B1 | 1/2007 | Sadhu et al. | |
| 7,191,138 B1 | 3/2007 | Roy et al. | |
| 7,197,740 B2 | 3/2007 | Beringer et al. | |
| 7,234,131 B1 | 6/2007 | Speyrer et al. | |
| 7,272,575 B2 | 9/2007 | Vega | |
| 7,292,990 B2 | 11/2007 | Hughes | |
| 7,302,674 B1 | 11/2007 | Gladieux et al. | |
| 7,318,216 B2 | 1/2008 | Diab | |
| 7,337,429 B1 | 2/2008 | Psaras et al. | |
| 7,360,201 B2 | 4/2008 | Srivastava | |
| 7,406,432 B1 | 7/2008 | Motoyama | |
| 7,406,453 B2 | 7/2008 | Mundie et al. | |
| 7,418,443 B2 | 8/2008 | Yoshimura et al. | |
| 7,421,648 B1 | 9/2008 | Davis | |
| 7,422,374 B2 | 9/2008 | Pitwon | |
| 7,483,841 B1 | 1/2009 | Jin et al. | |
| 7,516,439 B2 | 4/2009 | Robinson | |
| 7,546,575 B1 | 6/2009 | Dillman et al. | |
| 7,603,653 B2 | 10/2009 | Sundararajan et al. | |
| 7,735,062 B2 | 6/2010 | De Seabra e Melo et al. | |
| 7,752,606 B2 | 7/2010 | Savage | |
| 7,774,742 B2 | 8/2010 | Gupta et al. | |
| 7,774,747 B2 | 8/2010 | Kayam et al. | |
| 7,778,866 B2 | 8/2010 | Hughes | |
| 7,810,067 B2 | 10/2010 | Kaelicke et al. | |
| 7,823,120 B2 | 10/2010 | Kazakov et al. | |
| 7,853,556 B2 | 12/2010 | Swaminathan et al. | |
| 7,865,875 B2 | 1/2011 | Hockenberry et al. | |
| 7,908,582 B2 | 3/2011 | Pepin et al. | |
| 7,913,222 B2 | 3/2011 | Ogilvie et al. | |
| 7,926,029 B1 | 4/2011 | Stoyen et al. | |
| 7,987,110 B2 | 7/2011 | Cases et al. | |
| 8,006,222 B2 | 8/2011 | Ruhe | |
| 8,108,855 B2 | 1/2012 | Dias et al. | |
| 2001/0037494 A1 | 11/2001 | Levien et al. | |
| 2002/0029272 A1 | 3/2002 | Weller | |
| 2002/0038449 A1 | 3/2002 | Green et al. | |
| 2002/0046157 A1 | 4/2002 | Solomon | |
| 2002/0065700 A1* | 5/2002 | Powell et al. | 705/9 |
| 2002/0069079 A1 | 6/2002 | Vega | |
| 2002/0095650 A1 | 7/2002 | Green et al. | |
| 2002/0104067 A1 | 8/2002 | Green et al. | |
| 2002/0156668 A1 | 10/2002 | Morrow et al. | |
| 2003/0055659 A1 | 3/2003 | Alling | |
| 2003/0093477 A1 | 5/2003 | Daimon | |
| 2003/0097650 A1 | 5/2003 | Bahrs et al. | |
| 2003/0101089 A1 | 5/2003 | Chappel et al. | |
| 2003/0106039 A1 | 6/2003 | Rosnow et al. | |
| 2003/0158760 A1 | 8/2003 | Kannenberg | |
| 2003/0192029 A1 | 10/2003 | Hughes | |
| 2003/0221184 A1 | 11/2003 | Gunjal et al. | |
| 2004/0010772 A1 | 1/2004 | McKenna et al. | |
| 2004/0015870 A1 | 1/2004 | Arbouzov et al. | |
| 2004/0030696 A1 | 2/2004 | Lechner | |
| 2004/0044617 A1 | 3/2004 | Lu | |
| 2004/0064805 A1 | 4/2004 | Sparago et al. | |
| 2004/0073886 A1 | 4/2004 | Irani | |
| 2004/0093584 A1 | 5/2004 | Le | |
| 2004/0143811 A1 | 7/2004 | Kaelicke et al. | |
| 2004/0229199 A1 | 11/2004 | Ashley et al. | |
| 2004/0255265 A1 | 12/2004 | Brown et al. | |
| 2004/0268296 A1 | 12/2004 | Kayam et al. | |
| 2005/0015678 A1 | 1/2005 | Miller | |
| 2005/0114829 A1 | 5/2005 | Robin et al. | |
| 2005/0160395 A1 | 7/2005 | Hughes | |
| 2005/0166178 A1 | 7/2005 | Masticola et al. | |
| 2005/0198618 A1 | 9/2005 | Lalonde et al. | |
| 2005/0216882 A1 | 9/2005 | Sundararajan et al. | |
| 2005/0234698 A1 | 10/2005 | Pinto et al. | |
| 2005/0283751 A1 | 12/2005 | Bassin et al. | |
| 2006/0031110 A1* | 2/2006 | Benbassat et al. | 705/9 |
| 2006/0031812 A1 | 2/2006 | Olson et al. | |
| 2006/0036954 A1 | 2/2006 | Satyadas et al. | |
| 2006/0064486 A1 | 3/2006 | Baron et al. | |
| 2006/0069605 A1 | 3/2006 | Hatoun | |
| 2006/0070020 A1 | 3/2006 | Puttaswamy et al. | |
| 2006/0123060 A1* | 6/2006 | Allen et al. | 707/200 |
| 2006/0172724 A1 | 8/2006 | Linkert et al. | |
| 2006/0184933 A1 | 8/2006 | Chessell et al. | |
| 2006/0229929 A1 | 10/2006 | Hughes et al. | |
| 2006/0235732 A1 | 10/2006 | Miller et al. | |
| 2006/0248504 A1 | 11/2006 | Hughes | |
| 2006/0293942 A1 | 12/2006 | Chaddha et al. | |
| 2006/0294439 A1 | 12/2006 | Rolia et al. | |
| 2007/0006122 A1 | 1/2007 | Bailey et al. | |
| 2007/0006161 A1 | 1/2007 | Kuester et al. | |
| 2007/0083813 A1 | 4/2007 | Lui et al. | |
| 2007/0094256 A1 | 4/2007 | Hite et al. | |
| 2007/0118433 A1 | 5/2007 | Bess | |
| 2007/0124231 A1 | 5/2007 | Ristock et al. | |
| 2007/0143735 A1 | 6/2007 | Clemm et al. | |
| 2007/0174810 A1 | 7/2007 | Hockenberry et al. | |
| 2007/0198558 A1 | 8/2007 | Chen | |
| 2007/0203778 A1* | 8/2007 | Lowson et al. | 705/9 |
| 2007/0220479 A1 | 9/2007 | Hughes | |
| 2007/0233538 A1 | 10/2007 | Zpevak et al. | |
| 2007/0240154 A1 | 10/2007 | Gerzymisch et al. | |
| 2007/0288107 A1 | 12/2007 | Fernandez-Ivern et al. | |
| 2008/0034347 A1 | 2/2008 | V et al. | |
| 2008/0046859 A1 | 2/2008 | Velarde et al. | |
| 2008/0066072 A1* | 3/2008 | Yurekli et al. | 718/104 |
| 2008/0075268 A1* | 3/2008 | Medina et al. | 379/265.06 |
| 2008/0082959 A1 | 4/2008 | Fowler | |
| 2008/0141242 A1 | 6/2008 | Shapiro | |
| 2008/0155508 A1 | 6/2008 | Sarkar et al. | |
| 2008/0178145 A1 | 7/2008 | Lindley | |
| 2008/0255693 A1 | 10/2008 | Chaar et al. | |
| 2008/0255696 A1 | 10/2008 | Chaar | |
| 2008/0256390 A1 | 10/2008 | Chaar | |
| 2008/0256505 A1 | 10/2008 | Chaar et al. | |
| 2008/0256506 A1 | 10/2008 | Chaar et al. | |
| 2008/0256507 A1 | 10/2008 | Chaar | |
| 2008/0256516 A1 | 10/2008 | Chaar et al. | |
| 2008/0256529 A1 | 10/2008 | Chaar | |
| 2008/0282219 A1 | 11/2008 | Seetharaman et al. | |
| 2009/0043622 A1 | 2/2009 | Finlayson | |
| 2009/0043631 A1 | 2/2009 | Finlayson et al. | |
| 2009/0055237 A1 | 2/2009 | Henry et al. | |
| 2009/0055795 A1 | 2/2009 | Finlayson | |
| 2009/0064322 A1 | 3/2009 | Finlayson | |
| 2009/0100406 A1 | 4/2009 | Greenfield et al. | |
| 2009/0125875 A1 | 5/2009 | Schmitter et al. | |
| 2009/0204471 A1 | 8/2009 | Elenbaas et al. | |
| 2009/0210282 A1 | 8/2009 | Elenbaas et al. | |
| 2009/0300577 A1 | 12/2009 | Bernardini et al. | |
| 2009/0300586 A1 | 12/2009 | Bernardini et al. | |
| 2010/0017252 A1 | 1/2010 | Chaar et al. | |
| 2010/0017782 A1 | 1/2010 | Chaar et al. | |
| 2010/0023918 A1 | 1/2010 | Bernardini et al. | |
| 2010/0023919 A1 | 1/2010 | Chaar et al. | |
| 2010/0023920 A1 | 1/2010 | Chaar et al. | |
| 2010/0023921 A1 | 1/2010 | Chaar et al. | |
| 2010/0031090 A1 | 2/2010 | Bernardini et al. | |
| 2010/0031226 A1 | 2/2010 | Chaar et al. | |
| 2010/0031234 A1 | 2/2010 | Chaar et al. | |
| 2010/0162200 A1 | 6/2010 | Kamiyama et al. | |
| 2010/0198647 A1* | 8/2010 | Bowers et al. | 705/9 |
| 2010/0269087 A1 | 10/2010 | Kabra | |
| 2012/0124559 A1 | 5/2012 | Kondur | |

OTHER PUBLICATIONS

A systematic approach for resource allocation in software projects, Luis Daniel Otero, Grisselle Centeno, Alex J. Ruiz-Torres, Carlos E.

Otero, Computers & Industrial Engineering, vol. 56, Issue 4, May 2009, pp. 1333-1339.*
"Optimize Resources and Services to Meet Business Goals", Ptak, Noel & Associates, White Paper, pp. 1-9, Oct. 2005.
"EPM Live—Give Your Organization the Performance Edge", Microsoft Office Project, pp. 1-14, 2008.
C. Haas et al., "Distribution of Craft Management Skills in a Tier II Work Team", Center for Construction Industry Studies, Report No. 23, The University of Texas at Austin, pp. 1-27, Jan. 2002.
M. Pinedo, "Scheduling: Theory, Algorithms, and Systems", Prentice Hall, NJ, 2002. Emphasis on pp. 179-197, 357-366, 427-450.
U.S. Appl. No. 12/183,566—Notice of Allowance Mailed May 9, 2012.
U.S. Appl. No. 12/178,185—Non-Final Office Action Mailed May 8, 2012.
U.S. Appl. No. 12/173,175—Non-Final Office Action Mailed May 4, 2012.
Brykczynski, B., "A Survey of Software Inspection Checklists," ACM, Jan. 1999, p. 82-89.
Keil et al., "The Influence of Checklists and Roles on Software Practitioner Risk Perception and Decision-Making," IEEE, 2006, p. 1-12.
Objectbuilders, Inc., "Software Factory Assembly Methodology and Training Pathways," Copyright 2006, www.objectbuilders.com/downloads/SF_Methodology_WP.pdf.
Department of Commerce, "IT Architecture Capability Maturity Model," May 2003, 15 Pgs, http://ocio.os.doc.gov/groups/public/@doc/@os/@ocio/@oitpp/documents/content/prod01_002340.pdf.
Slaughter et al., "Aligning Software Processes With Strategy," MIS Quarterly, vol. 30, No. 4, pp. 891-918, 2006.
Musat et al., "Value Stream Mapping Integration in Software Product Lines," ACM PROFES, pp. 110-111, 2010.
Rosenmuller et al., "Tailoring Dynamic Software Product Lines," ACM GPCE, pp. 3-12, 2011.
Yoshida et al., "The Integrated Software Product Line Model," IEEE pp. 538-543, 2004.
Amin et al., "A Proposed Reusability Attribute Model for Aspect Oriented Software Product Line Components," IEEE, pp. 1138-1141, 2010.
U.S. Appl. No. 12/183,566—Non-Final Office Action Mailed Nov. 9, 2011.
U.S. Appl. No. 12/177,645—Non-Final Office Action Mailed May 23, 2011.
U.S. Appl. No. 12/177,645—Notice of Allowance Mailed Nov. 2, 2011.
U.S. Appl. No. 11/735,152—Non-Final Office Action Mailed Apr. 29, 2011.
U.S. Appl. No. 11/735,152—Non-Final Office Action Mailed Feb. 15, 2012.
U.S. Appl. No. 11/735,152—Final Office Action Mailed Sep. 21, 2011.
U.S. Appl. No. 12/173,175—Non-Final Office Action Mailed Aug. 3, 2011.
U.S. Appl. No. 11/735,120—Non-Final Office Action Mailed Sep. 29, 2010.
U.S. Appl. No. 11/735,120—Notice of Allowance Mailed Feb. 1, 2011.
U.S. Appl. No. 12/129,304—Non-Final Office Action Mailed Mar. 27, 2012.
U.S. Appl. No. 11/735,056—Non-Final Office Action Mailed Dec. 23, 2010.
U.S. Appl. No. 11/735,056—Non-Final Office Action Mailed Jun. 9, 2011.
U.S. Appl. No. 11/735,056—Notice of Allowance Mailed Dec. 1, 2011.
Lucia A., et al., "Assessing the Maintenance Processes of a Software Organization: An Empirical Analysis of a Large Industrial Project," Journal of Systems and Software 2003; 65(2): 87-103.
De Lucia, A., et al., "Early Effort Estimation of Massive Maintenance Processes," Software Maintenance, 2002. Proceedings. International Conference on, pp. 234-237.

U.S. Appl. No. 12/177,315—Examiner's Answer Mailed Mar. 27, 2012.
U.S. Appl. No. 12/129,438—Requirement for Information Under 37 CFR 1.105 Mailed Apr. 12, 2012.
U.S. Appl. No. 11/835,200—Non-Final Office Action Mailed May 26, 2011.
U.S. Appl. No. 11/835,200—Notice of Allowance Mailed Nov. 28, 2011.
Coqueiro et al., "Developing Portlets Using Eclipse and Websphere Portlet Factory," IBM, Jun. 5, 2006.
Kramer, "IBM Websphere Portlet Factory 5.11.3," Patricia Seybold Group, Mar. 2006.
U.S. Appl. No. 11/844,031—Non-Final Office Action Mailed Nov. 28, 2011.
IBM, "Service-Oriented Web Application Development With IBM Websphere Portlet Factory Software," Mar. 2006.
U.S. Appl. No. 11/847,952—Non-Final Office Action Mailed Aug. 30, 2011.
U.S. Appl. No. 11/847,952—Non-Final Office Action Mailed Mar. 5, 2012.
Dominguez et al., "Quality in Development Process for Software Factories According to ISO 15504", Jun. 2006, CLEI Electronic Journal, vol. 9, No. 1, Paper 3.
J. Zhou et al., "Modeling Network Instrusion Detection Alerts for Correlation," ACM Transactions on Information and System Security, vol. 10, No. 1, Article 4, Feb. 2007, pp. 1-31.
S. Degwekar et al., "Event-Triggered Data and Knowledge Sharing Among Collaborating Government Organizations," ACM International Conference Proceeding Series, vol. 228: Proceedings of the 8th Annual International Digital Government Research Conference, Philadelphia, PA, May 20-23, 2007, pp. 102-111.
Greenfield, Jack et al., "Software Factories Assembling Applications With Patterns, Models, Frameworks and Tools," Oct. 2003, ACM 1-58113-751-06/03/0010.
IBM, "IBM Web Experience Factory (Formerly Websphere Portlet Factory)" Web Site, Retrieved From [URL: http://www-01.ibm.com/software/genservers/webexperiencefactory/] on Oct. 3, 2011.
U.S. Appl. No. 12/173,388—Non-Final Office Action Mailed Jun. 24, 2011.
U.S. Appl. No. 12/177,315—Non-Final Office Action Mailed May 4, 2011.
U.S. Appl. No. 12/177,315—Final Office Action Mailed Nov. 2, 2011.
U.S. Appl. No. 12/129,438—Request for Information Under Rule 105 Mailed Oct. 18, 2011.
IBM, "Best Practices for Service-Oriented Model Development With IBM Websphere Portlet Factory Software," Mar. 2006, pp. 1-16.
U.S. Appl. No. 11/735,099—Non-Final Office Action Mailed Apr. 16, 2012.
U.S. Appl. No. 11/836,937—Non-Final Office Action Mailed Apr. 18, 2012.
U.S. Appl. No. 11/735,070—Non-Final Office Action Mailed Apr. 26, 2012.
U.S. Appl. No. 11/735,086—Non-Final Office Action Mailed May 18, 2012.
U.S. Appl. No. 11/844,031—Final Office Action Mailed May 25, 2012.
U.S. Appl. No. 11/735,275—Non-Final Office Action Mailed Jun. 5, 2012.
U.S. Appl. No. 12/178,185—Notice of Allowance Mailed Oct. 2, 2012.
U.S. Appl. No. 11/735,168—Final Office Action Mailed Oct. 18, 2012.
U.S. Appl. No. 11/735,086—Final Office Action Mailed Oct. 22, 2012.
U.S. Appl. No. 12/129,304—Final Office Action Mailed Nov. 16, 2012.
Lenz, G., and Wienands, C., "Practical Software Factories in .Net", Springer-Verlag, New York, NY, USA, 2006, pp. 1-230.

U.S. Appl. No. 12/173,175—Notice of Allowance Mailed Nov. 29, 2012.
Amaral, J., et al., "Analyzing Supply Chains at HP Using Spreadsheet Models," Interfaces, Jul./Aug. 2008, vol. 38, No. 4, pp. 228-240.
U.S. Appl. No. 12/129,438—Non-Final Office Action Mailed Dec. 19, 2012.

Forsberg et al., "Managing Outsourcing of Software Development", Stockholm University/Royal Institute of Technology, Dept. of Computer and Systems Sciences, Master Thesis, Spring 2001, pp. 1-54.

* cited by examiner

SCHEDULING RESOURCES FROM A MULTI-SKILL MULTI-LEVEL HUMAN RESOURCE POOL

BACKGROUND

The present disclosure relates to the field of computers, and specifically to the use of computers in allocating human resources. Still more particularly, the present disclosure relates to the use of computers to allocate human resources to functional areas of an activity environment.

BRIEF SUMMARY

A computer implemented method, system, and/or computer program product automate allocation of human resources to functional areas of an enterprise activity environment and scheduling of work items to the functional areas. Each work item from a group of work items is categorized as either complex or intense, and a unique work requirement statement is derived for each work item based on whether it is complex or intense. A unique resource value statement is assigned to different human resources. Past performances of the human resources are analyzed against completed work items in order to adjust the unique resource value statement, thus creating updated human resource value statements. An optimized work requirement statement is created by recalculating the unique work requirement statement for each work item based on the updated human resource value statements. A schedule for automated allocation of human resources to functional areas of an enterprise activity environment and scheduling of work items to the functional areas is formulated based on the optimized requirement statement for each work item in the group of work items.

DETAILED DESCRIPTION

Figure 1:
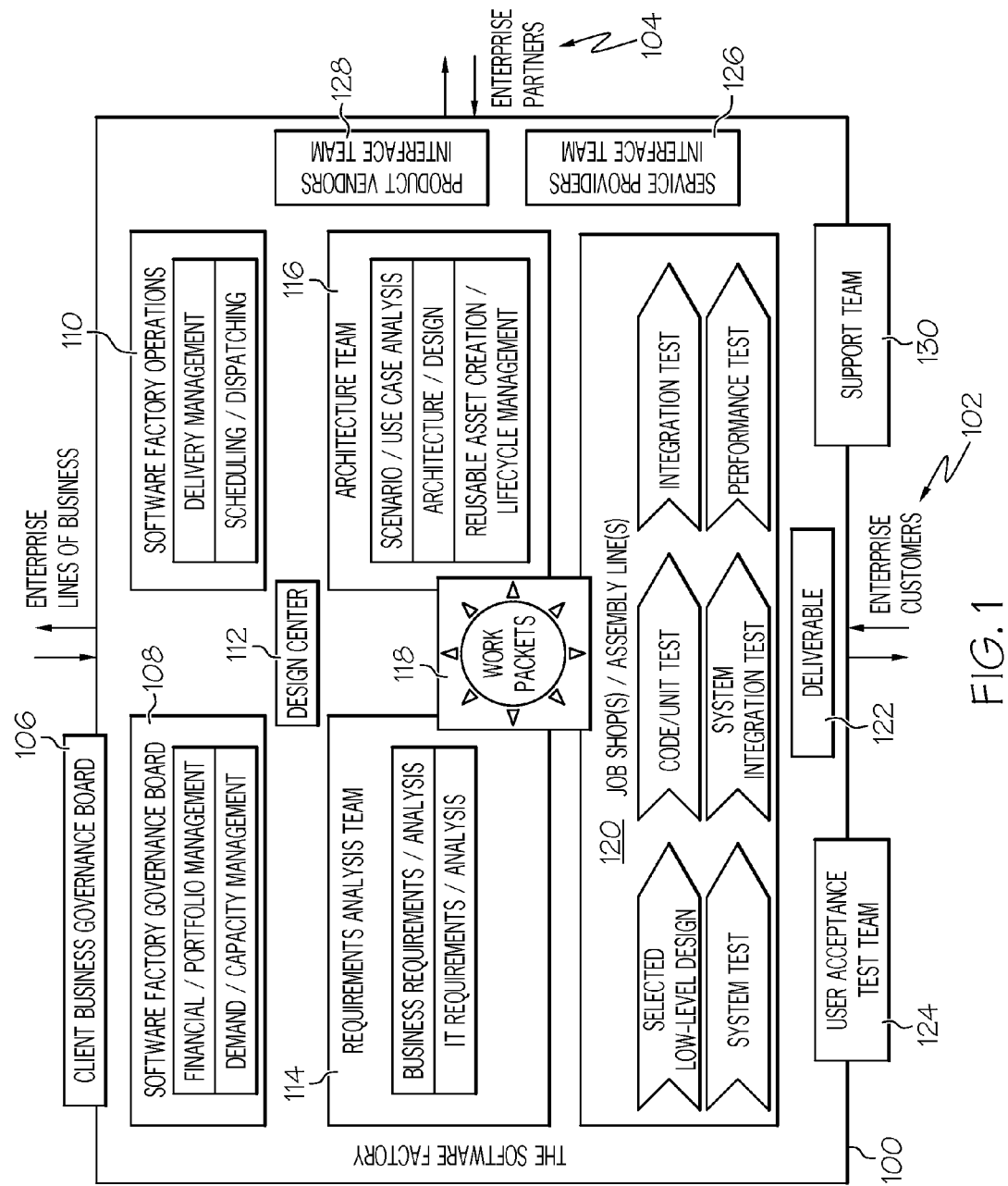
FIG. 1 is an overview of a software factory that may be used in one embodiment of the present disclosure.

As will be appreciated by one skilled in the art, some or all of the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some or all of the features described in the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

As described herein, one embodiment of the present disclosure relates to resource management and scheduling, and more particularly to a method for generating optimum assignment of work items to workers contingent on dynamic skill level and difficulty evaluations of workers and work items, respectively.

In one embodiment of the present disclosure, a software factory is utilized as an enterprise activity environment in which resources are to be allocated in accordance with parameters described herein. A software factory establishes a disciplined approach to leveraging global resources for application development and maintenance activities. As described herein, resources with similar skills are pooled by functional area(s) and geographically organized into assembly centers. Resources in an assembly center may have skills that enable them to work in other functional areas/move to other assembly centers. A resource allocated to multiple functional areas has a primary functional area. In the present disclosure, attention is paid to managing the allocation of resources to primary functional areas by taking into account both short term and long term consequences.

Described below is a software factory, which includes a collection of business and Information Technology (IT) governance models, operational models, delivery methods, metrics, environment and tools bundled together to improve the quality of delivered software systems, control cost overruns, and effect timely delivery of such systems. The software factory described herein offers a practical solution to developing software systems using multiple sites that are geographically distributed. The issues of varying time zones and the hand-over between various teams residing in such time zones are handled by exchanging work packets. A work packet is a self-contained work unit that is composed of processes, roles, activities, applications and the necessary input parameters that allow a team to conduct a development activity in a formalized manner with visibility to progress of their effort afforded to requesting teams.

The software factory described herein is a uniquely engineered scalable efficiency model construct that transforms a traditional software development art form into a repeatable scientific managed engineered streamline information supply chain. The software factory incorporates applied system and industrial engineering quality assured efficiencies that provide for the waste eliminating, highly optimized performed instrumentation, measured monitoring and risk mitigated management of software development.

Software Factory Overview

With reference now to the figures, and in particular to FIG. 1, an overview of a preferred embodiment of a software factory 100 is presented. As depicted, the software factory 100 is a service that interacts with both enterprise customers (i.e., client customers) 102 as well as enterprise partners (i.e., third party vendors) 104. The primary human interface with the enterprise customers 102 is through a Client Business Governance Board (CBGB) 106. CBGB 106 represents client stakeholders and client business sponsors that fund a project of the software factory 100. CBGB 106 can be an internal or external client. That is, the same enterprise (i.e., internal client) may include both CBGB 106 and software factory 100, or a first enterprise (i.e., external client) may have CBGB 106 while a second enterprise has the software factory 100. As described in greater detail below, a project proposal definition is then run through a software factory induction process in a Software Factory Governance Board (SFGB) 108 and Software Factory Operations (SFO) 110, where the project proposal definition is evaluated, qualified, scored and categorized. The project proposal definition is then subject to a System Engineering Conceptual Requirements Review by the SFGB 108. Based on the outcome of the review by the SFGB 108, a decision is made to accept the project proposal definition or to send it back to the CBGB 106 for remediation and resubmission through the Software Factory Induction Process.

Thus, Software Factory Governance, which includes SFGB 108 and SFO 110, provides the guidance, constraints, and underlying enforcement of all the factory policies and procedures, in support of their governing principles in support of the strategic objects of the Software Factory 100. Software Factory governance consists of factory business, IT and operations governance. The principles, policies and procedures of these models are carried out by two governing bodies—the Business Governance Board and the IT Governance Board (both part of SFGB 108), and an enforcement body—the Software Factory Operations 110.

Thus, Software Factory Governance is responsible for:
Business and IT strategic planning;
Assuring that Business and IT strategies are aligned;
Setting Goals;
Monitoring those goals;
Detecting problems in achieving those goals;
Analyzing Problems;
Identifying Reasons;
Taking Action;
Providing Feedback; and
Re-Strategizing (Continue process improvement).

As soon as a project is deemed worthy to proceed, the job of creating the custom software is sent to a Design Center 112, where the project is broken into major functional areas, including those handled by a Requirements Analysis Team 114 and an Architectural Team 116.

The Requirements Analysis Team 114 handles the Requirement Management side of the Design Center 112, and is responsible for collecting the business requirements from the lines of business and populating these requirements into the tools. Analysis of business requirements is also carried out in order to derive associated IT requirements. Some requirements (e.g. system requirements) may have a contractual constraint to use a certain infrastructure. Requirements are analyzed and used in the basis for business modeling. These requirements and representative business (contextual, event and process models) are then verified with and signed off from project stakeholders. Requirements are then base-lined and managed within release and version control.

The Architectural Side of the Design Center 112 is handled by the Architecture Team 116, which takes the output of the requirement/analysis/management side of the design center, and uses architectural decision factors (functional requirements, non-functional requirements, available technology, and constraints), to model a design with appropriate example representation into detail design specification, that is bundled with other pertinent factors into a work packet for assembly lines to execute.

Work Packets 118 are reusable, self-contained, discrete units of software code that constitute a contractual agreement that governs the relationship among Design Center 112, Software Factory Governance Board 108, Software Factory Operations 110, and Assembly Line 120. That is, each work packet 118 includes governance policies and procedures (e.g., including instructions for how work reports are generated and communicated to the client), standards (e.g., protocol for the work packet 118), reused assets (e.g., reusable blocks of code, including the requirements, instructions and/or links/pointers associated with those reusable blocks of code), work packet instructions (e.g., instructions for executing the work packet 118), integration strategy (e.g., how to integrate the work packet 118 into a client's security system), schedule (e.g., when deliverables are delivered to the client), exit criteria (e.g., a checklist for returning the work packet 118 and/or deliverables to the software factory 100), and Input/Output (I/O) work products (e.g., artifact checklist templates for I/O routines).

Assembly Line(s) 120 which are part of a Job Shop, include, but are not limited to any team that is initialized, skilled and certified to accept application factory work packets from the factory Design Center 112. Job Shops receive and execute the work packets 118, which are specified by the Design Center 112, to create a customized deliverable 122. As shown in exemplary manner, the assembly line 120 puts the work packets 118 into a selected low-level design to generate a deliverable (executable product). While assembly line 120 can be a manual operation in which a coding person assembles and tests work packets, in another embodiment this process is automated using software that recognizes project types, and automatically assembles work packets needed for a recognized project type.

Various tests can be performed in the assembly line 120, including code/unit tests, integration test, system test, system integration test, and performance test. "Code/unit test" tests the deliverable for stand-alone bugs. "Integration test" tests the deliverable for compatibility with the client's system. "System test" checks the client's system to ensure that it is operating properly. "System integration test" tests for bugs that may arise when the deliverable is integrated into the client's system. "Performance test" tests the deliverable as it is executing in the client's system. Note that if the deliverable is being executed on a service provider's system, then all tests described are obviously performed on the service provider's system rather than the client's system.

A User Acceptance Test Team 124 includes a client stakeholder that is charged with the responsibility of approving acceptance of deliverable 122.

Software factory 100 may utilize enterprise partners 104 to provide human, hardware or software support in the generation, delivery and/or support of deliverables 122. Such third party contractors are viewed as a resource extension of the software factory 100, and are governed under the same guidelines described above.

If an enterprise partner 104 is involved in the generation of work packets 118 and/or deliverables 122, an interface between the software factory 100 and the enterprise partner 104 may be provided by a service provider's interface team 126 and/or a product vendor's interface team 128. Service provided by an enterprise partner 104 may be a constraint that is part of contractual agreement with a client to provide specialized services. An example of such a constraint is a required integrated information service component that is referenced in the integration design portion of the work packet 118 that is sent to assembly line 120. Again, note that third party service providers use a standard integration strategy that is defined by the software factory 100, and, as such, are subject to and obligated to operate under software factory governance.

Product vendor's interface team 128 provides an interface with a Product Vendor, which is an enterprise partner 104 that provides software factory 100 with supported products that maybe used within a software factory solution. Product Vendors are also responsible for providing product support and maintaining vendor's relationships, which are managed under the software factory's governance guidelines.

Support Team 130 includes both Level 2 (L2) support and Level 1 (L1) support.

L2 Support is provided primarily by Software Engineers, who provide problem support of Software Factory produced delivered code for customers. That is, if a deliverable 122 doesn't run as designed, then the software engineers will troubleshoot the problem until it is fixed. These software engineers deliver technical assistance to Software Factory customers with information, tools, and fixes to prevent known software (and possibly hardware) problems, and provide timely responses to customer inquiries and resolutions to customer problems.

L1 support is primarily provided by an L1 Help Desk (Call Center). L1 Help Desk support can be done via self-service voice recognition and voice response, or by text chat to an automated smart attendant, or a call can be directed to a Customer Service Representative (CSR). Customer Service Representatives in this role provide first line of help problem support of Software Factory produced deliverables. Such help includes user instruction of known factory solution procedures. For any related customers issues that cannot be resolved through L1, the L1 Help Desk will provide preliminary problem identification and create trouble ticket entry into trouble tracking system, which then triggers a workflow event to dynamically route the problem issue to an available and appropriate L2 support group queue.

Figure 2:
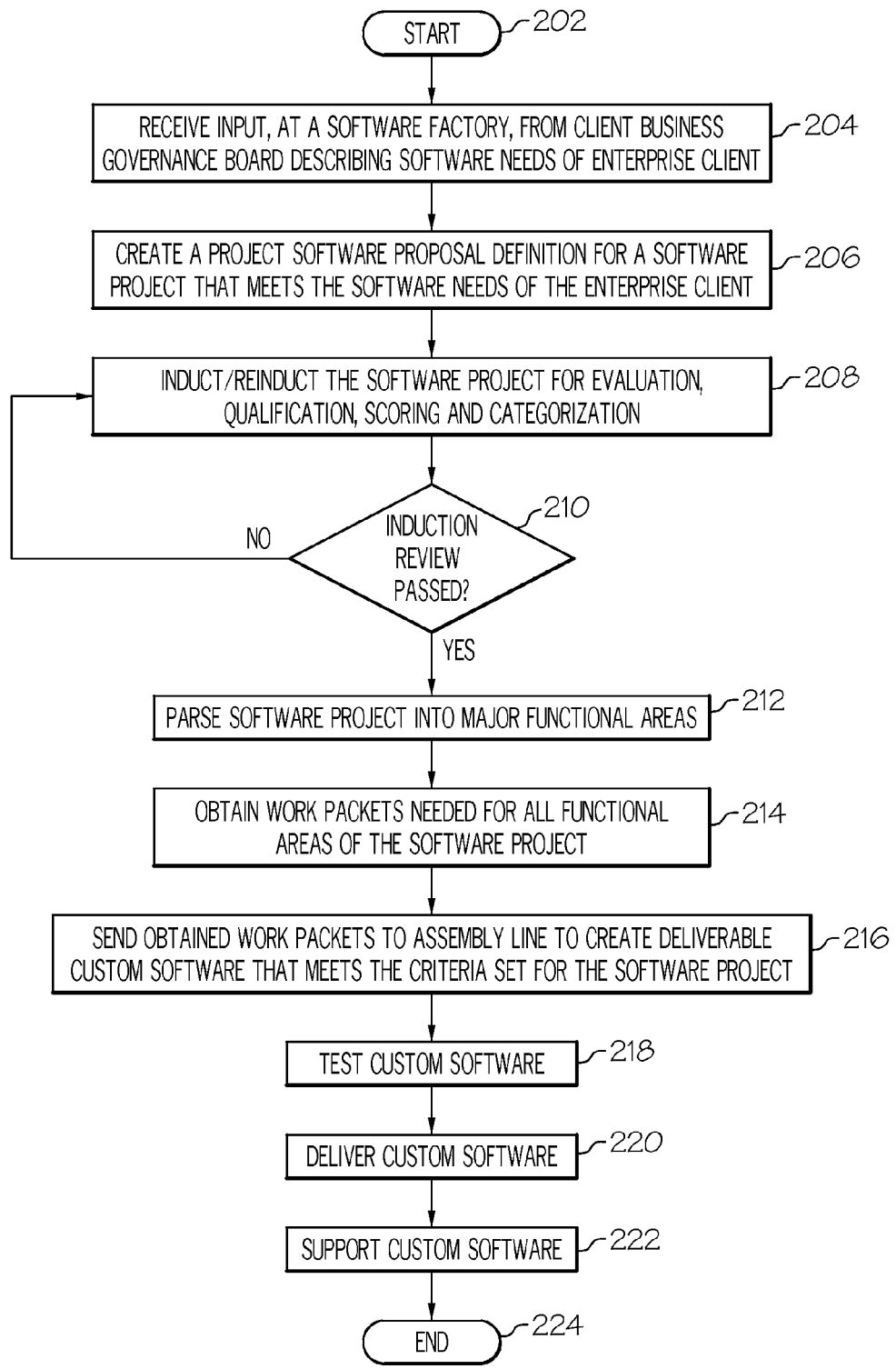
FIG. 2 is a flow-chart of steps taken to create custom software through the use of work packets in a software factory.

With reference now to FIG. 2, a flow-chart of exemplary steps taken to create custom software through the use of a software factory is presented. After initiator block 202, which may be a creation of a contract between an enterprise client and a software factory service, input, from a Client Business Governance Board, is received at a software factory (block 204). This input is a detailed description of the custom software needs of the enterprise client. While such input is usually prepared and presented by human management of the enterprise client, alternatively this input may be the creation of a Unified Modeling Language (UML) based description of the needed software. Based on the client's input, a project software proposal definition is created by the Software Factory Governance Board of the software factory (block 206). This project software proposal definition is sent to the scheduling/dispatching department of the Software Factory Operations, which creates a software project.

The software project is then inducted (block 208). As will be described in more detail below, the project induction provides an initial introduction of the project to the software factory. Through the use of various parameters, including those found in records of other projects, checklists, et al., the project is initially evaluated. This evaluation includes determining if the software factory has the capacity, resources, bandwidth, etc. needed for the project. If so, then a determination is made as to whether the project is qualified for acceptance by the software factory. Such qualification includes, but is not limited to, determining if the project falls within the guidelines set by a Service Level Agreement (SLA) between the client enterprise and the software factory, whether the project conforms to legal guidelines such as Sarbanes-Oxley, etc. Based on these and other criteria, the project is scored for feasibility, profitability, and desirability for implementation. If the induction process concludes that the project should proceed, then it is categorized into a particular type of project (e.g., payroll, inventory control, database management, marketing, et al.).

If the induction process does not pass (query block 210), indicating that the project should not proceed, then the project is returned to the Client Business Governance Board for additional discussions between the Client Business Governance Board and the software factory, in order to induct a revised project (i.e., reinduct the software project). However, if the induction process passes, then the software project is parsed into major functional areas (block 212). That is, the project is divided up ("broken apart") in order to establish subunits that can later be integrated into a single custom software ("deliverable").

Work packets are then obtained for all of the functional areas of the software project (block 214). These work packets are reusable components which are described in detail below. The work packets are then stitched together (block 216) on an assembly line to create deliverable custom software that meets the criteria for the software project that has been established in the earlier steps. The custom software is then tested in the software factory (block 218). Once testing is completed, the custom software is delivered (block 220) to the client customer, who receives on-going support from the support team (block 222). The flow-chart ends at terminator block 224.

While the process has been described for the creation of custom software, the same process is used by a software factory for other activities, including creating a service for a customer, creating standardized software, etc. Thus, the software factory uses work packets to blend software (including reusable artifacts), protocols (e.g., how software will be transmitted, how individuals will be contacted, etc.), governance requirements (e.g., service level agreements that describe how much a service will cost) and operating environments (hardware and software, including operating systems, integrated environments such as SAP™, Rational™, etc.) into a single integrated product, which can then be used in a stand-alone manner or can be fed into another system/product.

Note that software factory 100 may be virtual. That is, the different components (e.g., software factory governance board 108, software factory operations 110, design center 112, assembly line 120) may be located in different locations, and may operate independently under the control of information found in work packets 118. In a preferred embodiment, each of the different components of the software factory 100 publishes a set of services that the component can provide and a set of requirements for using these services. These services are functions that are well defined and made visible for outside entities to call.

For example, assume that assembly line 120 publishes a service that it can assemble only work packets that include code and protocol that utilize IBM's Rational™ software development platform. Thus, the assembly line 120 has published its service (set of services includes "assembling work packets") and the required protocol (set of requirements includes "utilize IBM's Rational™ software development platform") to the design center 112, which must decide if it wants (or is able) to utilize that particular assembly line 120. If not, then another assembly line from another software factory may be called upon by the design center 112. Behind each offered service are the actual processes that a component performs. These processes are steps taken by the service. Each step is performed by a section of software, or may be performed by an individual who has been assigned the task of performing this step. Each step utilizes leveraged tools, including the work packets 118 described herein. These work packets 118 then implement the process.

By utilizing published interfaces between the different components of the software factory 100, then different components from different software factories can be interchanged according to the capability offered by and protocol used by each component. This enables a "building block" architecture to be implemented through the use of different components from different software factories.

Life Cycle of a Work Packet

Figure 3:
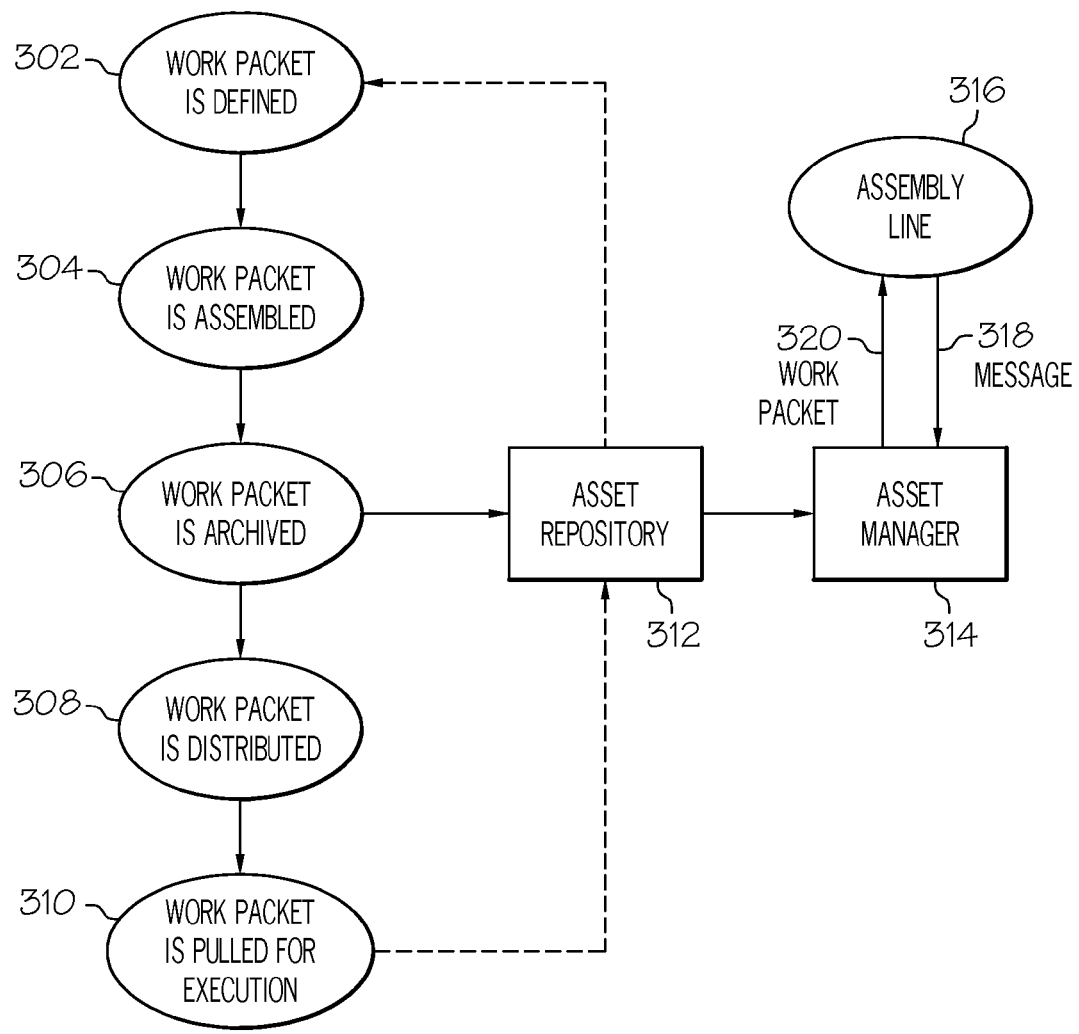
FIG. 3 presents an overview of the life cycle of work packets.

There are five phases in the life cycle of a work packet, which are shown in FIG. 3. These five phases are 1) Defining (block 302); 2) Assembling (block 304); Archiving (block 306); Distributing (block 308); and Pulling for Execution (block 310). As indicated by the top dashed line coming out of asset repository 312, this life cycle may be recursive. That is, in one embodiment, work packets are modified and upgraded in a recursive manner, which includes the steps shown in FIG. 3. Once a work packet is assembled and archived, it is stored in an asset repository 312, whence the work packet may be accessed and utilized by an asset manager 314 for assembly into a deliverable by an assembly line 316. Note that the assembly line 316 can also send, to the asset manager 314, a message 318 that requests a particular work packet 320, which can be pulled (block 310) into the asset repository 312 by the asset manager 314. This pulling step (block 310), is performed through intelligent routing distribution (block 308) to the asset repository 312 and assembly line 316. The configuration of the routing distribution of the work packet 320 is managed by the asset manager 314, which is software that indexes, stores and retrieves assets created and used with the software factory.

Work Packet Components

A work packet is a self-contained work unit that comprises processes, roles, activities (parts of the job), applications, and necessary input parameters that allow a team to conduct a development activity in a formalized manner, with visibility to progress of their effort afforded to requesting teams. A work packet is NOT a deliverable software product, but rather is a component of a deliverable software product. That is, a work packet is processed (integrated into a system, tested, etc.) to create one or more deliverables. Deliverables, which were created from one or more work packets, are then combined into a custom software, such as an application, service or system.

In a preferred embodiment, a work packet is composed of the following eight components:

Governance Policies and Procedures—these policies and procedures include protocol definitions derived from a project plan. That is, a project plan for a particular custom software describes how work packets are called, as well as how work packets report back to the calling plan.

Standards—this component describes details about how work packets are implemented into a deliverable in a standardized manner Examples of such standards are naming conventions, formatting protocol, etc.

Reused Assets—this component includes actual code, or at least pointers to code, that is archived for reuse by different assembled deliverables.

Work Packet Instructions—this component describes detailed instructions regarding how a work packet is actually executed. That is, work packet instructions document what work packets need to be built, and how to build them. These instructions include a description of the requirements that need to be met, including design protocols, code formats, and test parameters.

Integration Strategy—this component describes how a set of work packets, as well as deliverables developed from a set of work packets, are able to be integrated into a client's system. This component includes instructions regarding what processes must be taken by the client's system to be prepared to run the deliverable, as well as security protocols that must be followed by the deliverable. The component may also include a description of how one deliverable will interact with other applications that are resident to the client's computer system.

Scheduling—this component describes when a set of work packets are to be sent to an assembly line, plus instructions on monitoring the progress and status of the creation of the work packet.

Exit Criteria—this component includes instructions (e.g., through the use of a checklist) for deploying a deliverable to the client's system. That is, this component is the quality criteria that the deliverable must meet before it can be considered completed and acceptable for a project.

Input Work Products—this component includes Input/Output (I/O) templates that are used to describe specific work products that are needed to execute the activities of the work packet (in the assembly line) to build the deliverable.

Defining a Work Packet

The process of defining a work packet is called a "work packet definition process." This process combines critical references from governance, factory operations (e.g., factory management, project management), business criteria, and design (including test) artifacts. Structured templates enable governance, design center, and factory operations to define the referenced artifacts by filling in corresponding functional domain templates, thus defining the contents of the work packet. Thus, a work packet includes not only reusable software code, but also includes governance and operation instructions. For example, a work packet may include directions that describe a sequence of steps to be taken in a project; which data is to be used in the project; which individuals/departments/job descriptions are to perform each step in the project; how assigned individuals/departments are to be notified of their duties and what steps/data are to be taken and used, et al. Thus, each work packet includes traceability regarding the status of a job, as well as code/data/individuals to be used in the execution of a project.

Thus, work packets are created from unique references to governance, factory operations (factory mgt, project mgt), business, and design (including test) artifacts. The packet definition process provides structure templates that enable governance, design center, and factory operations to define referenced artifacts (newly defined artifact identifiers or any reusable part of existing work packet definitions), by filling in corresponding functional domain (e.g., eXtensible Markup Language—XML) templates. What can be defined may be controlled by a Document Type Definition (DTD). The DTD states what tags and attributes are used to describe content in the deliverable, including where each XML tag is allowed and which XML tags can appear within the deliverable. XML tag values are defined and applied to a newly defined XML template for each functional area of a design center. These XML templates are then merged into one hierarchical structure when later assembled into finalized work packets.

Figure 4:
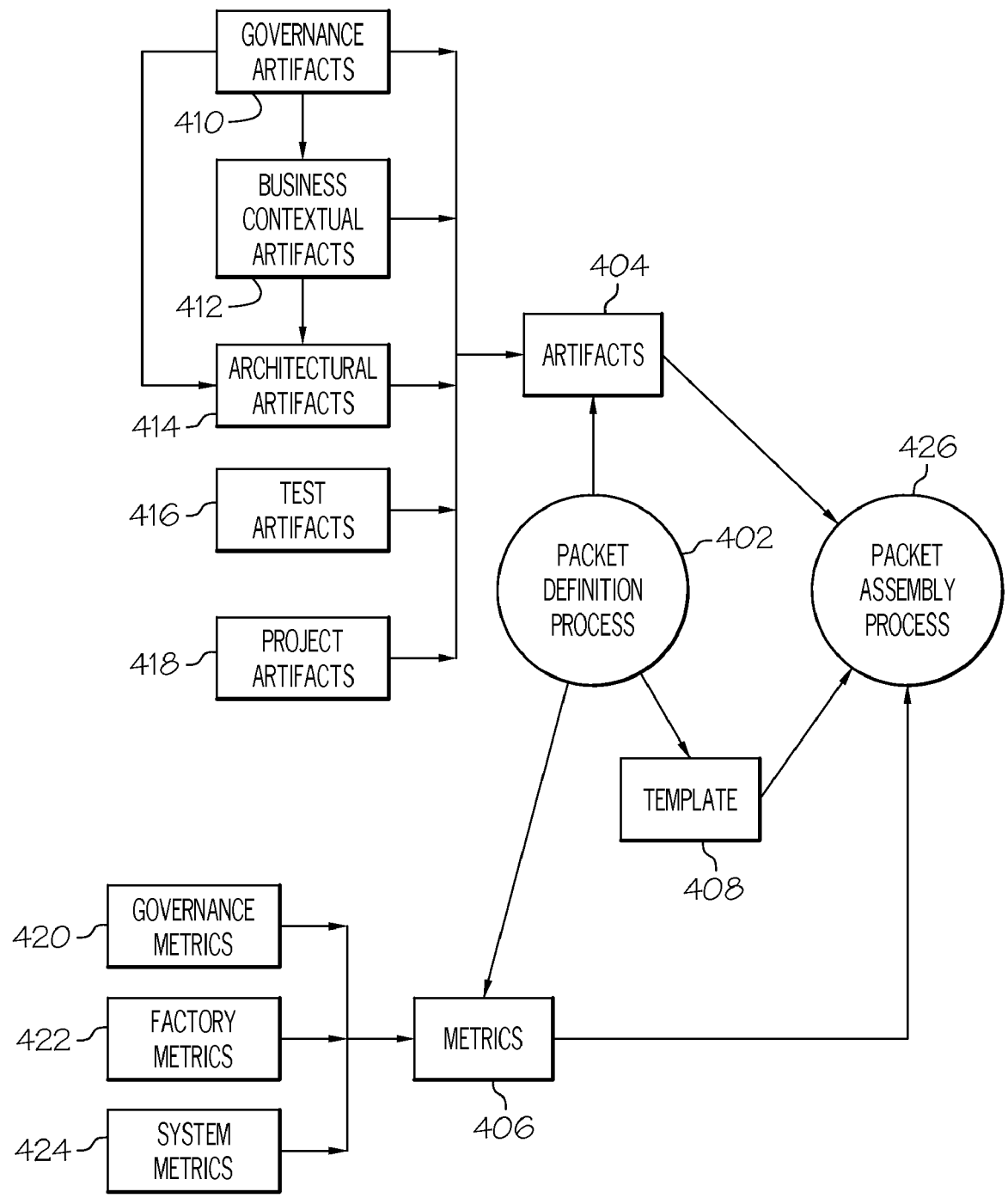
FIG. 4 presents an overview of an environment in which work packets are defined and assembled.

With reference now to FIG. 4, an overview of the environment in which a packet definition process 402 occurs is presented. The packet definition process 402 calls artifacts 404, metrics 406, and a template 408 to define a work packet. The artifacts may be one or more of: governance artifacts 410 (intellectual property assets produced in the software factory by the Software Factory Governance Board 108 described in FIG. 1); business contextual artifacts 412 (intellectual property assets produced in the software factory by business analysts in the requirement analysis team 114 described in FIG. 1); architectural artifacts 414 (intellectual property assets produced by the architecture team 116 described in FIG. 1); test artifacts 416 (intellectual property assets produced by test architects in the architecture team 116 shown in FIG. 1); and project artifacts 418 (intellectual property assets produced in the software factory by system engineers in the design center 112 shown in FIG. 1).

The metrics 406 may be one or more of: governance metrics 420 (measurable governance indicators, such as business plans); factory metrics 422 (measurable indicators that describe the capabilities of the software factory, including assembly line capacity); and system metrics 424 (measurable indicators that describe the capabilities of the client's computer system on which deliverables are to be run).

Based on a template 408 for a particular deliverable, artifacts 404 and metrics 406 are used by a packet assembly process 426 to assemble one or more work packets.

Assembling a Work Packet

Template 408, shown in FIG. 4, describes how a work packet is to be assembled. The template 408 includes metadata references to key artifacts 404 and metrics 406, which are merged into a formal work packet definition as described above. The work packet is then assembled in a standardized hierarchical way and packaged within a factory message envelope that contains a header and body.

Figure 5:
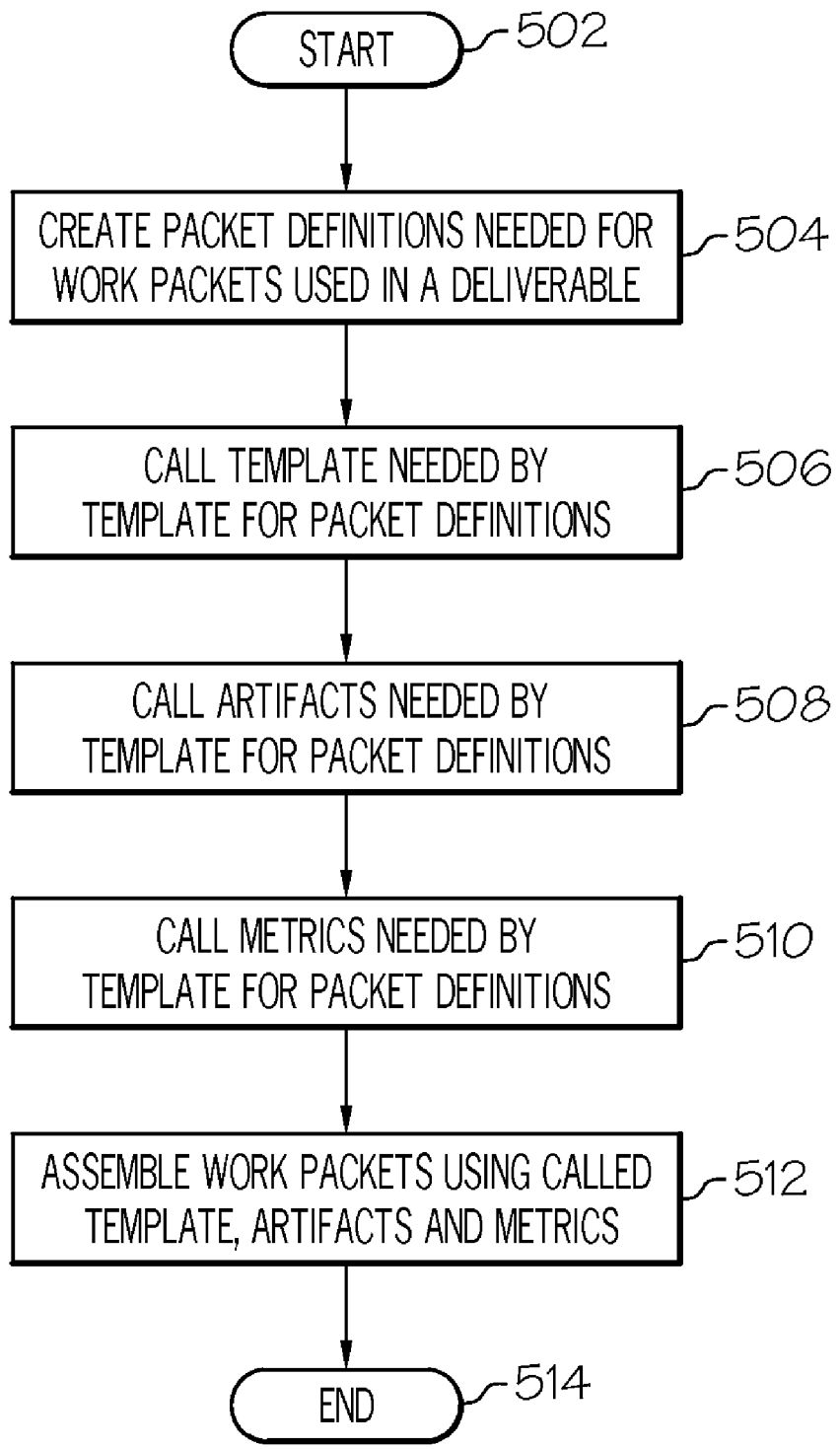
FIG. 5 is a high-level flow-chart of steps taken to define and assemble work packets.

With reference now to FIG. 5, a high-level flow-chart of steps taken to define and assemble work packets is presented. After initiator block 502 (which may be an order by the Requirements Analysis Team 114 to the Architecture Team 116, shown in FIG. 1, to create a design center-defined work packet), the requisite packet definitions are created for work packets that are to be used in deliverables (block 504). First, a template, which preferably is a reusable that has been used in the past to create the type of work packet needed, is called (block 506). Based on that called template, the needed artifacts (block 508) and metrics (block 510) are called. Using the template as a guide, the called artifacts and metrics are assembled in the requisite work packets (block 512), and the process ends.

Figure 6:
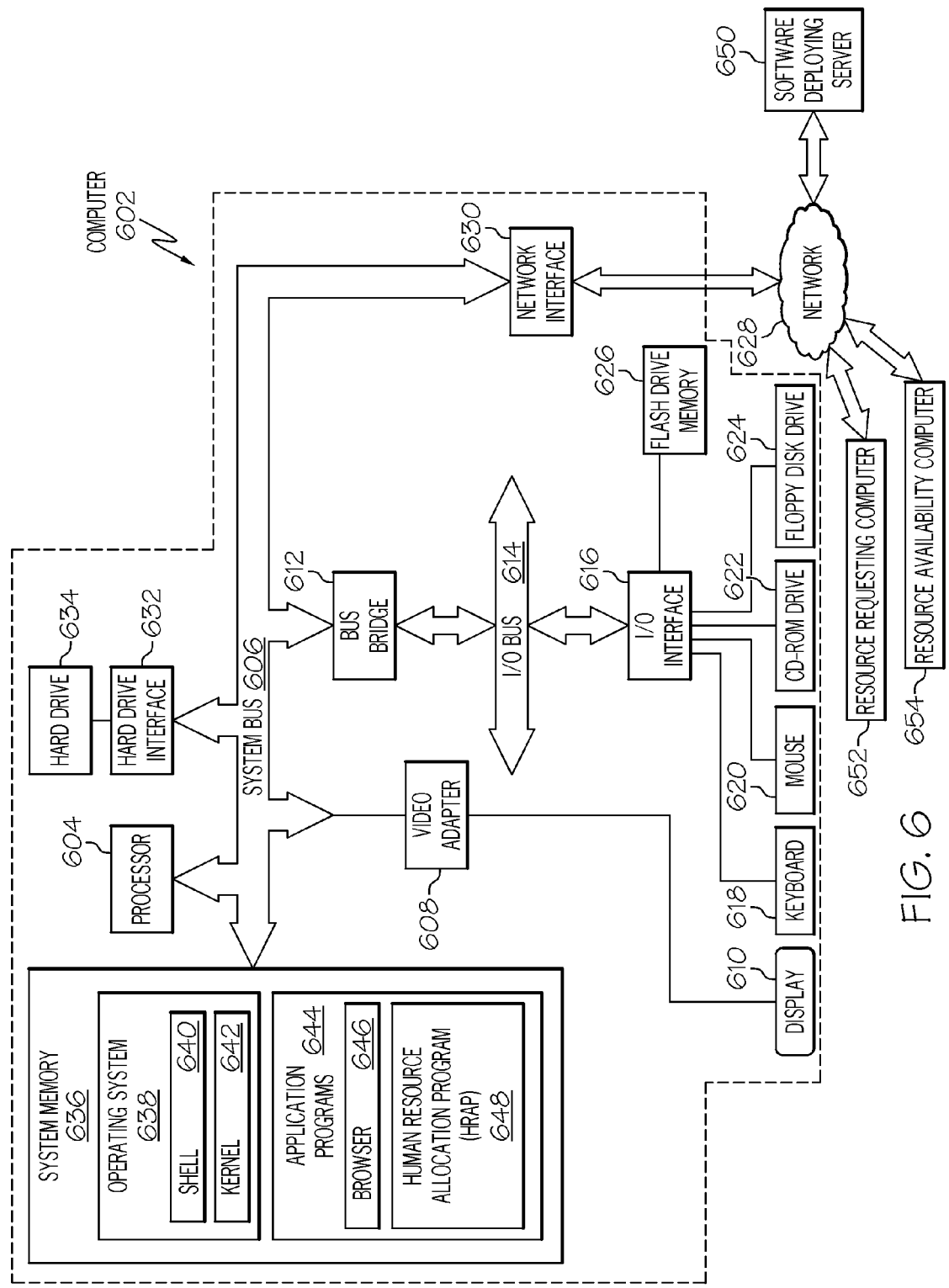
FIG. 6 illustrates an exemplary computer in which the present invention may be utilized.

With reference now to the figures, and in particular to FIG. 6, there is depicted a block diagram of an exemplary computer 602, which may be utilized by the present disclosure. Computer 602 includes a processor unit 604 that is coupled to a system bus 606. Processor unit 604 may utilize one or more processors, each of which has one or more processor cores. A video adapter 608, which drives/supports a display 610, is also coupled to system bus 606. System bus 606 is coupled via a bus bridge 612 to an input/output (I/O) bus 614. An I/O interface 616 is coupled to I/O bus 614. I/O interface 616 affords communication with various I/O devices, including a keyboard 618, a mouse 620, a media tray 622 (which may include storage devices such as CD-ROM drives, multi-media interfaces, etc.), a floppy disk drive 624, and flash drive memory 626. While the format of the ports connected to I/O interface 616 may be any known to those skilled in the art of computer architecture, in a preferred embodiment some or all of these ports are universal serial bus (USB) ports. Note that some or all of the architecture depicted for computer 602 may be utilized by software deploying computer 650, resource requesting computer 652, and/or resource availability computer 654.

As depicted, in one embodiment, computer 602 is optionally able to communicate via network 628 using a network interface 630. Network 628 may be an external network such as the Internet, or an internal network such as an Ethernet or a virtual private network (VPN).

A hard drive interface 632 is also coupled to system bus 606. Hard drive interface 632 interfaces with a hard drive 634. In a preferred embodiment, hard drive 634 populates a system memory 636, which is also coupled to system bus 606. System memory is defined as a lowest level of volatile memory in computer 602. This volatile memory includes additional higher levels of volatile memory (not shown), including, but not limited to, cache memory, registers and buffers. Data that populates system memory 636 includes computer 602's operating system (OS) 638 and application programs 644.

OS 638 includes a shell 640, for providing transparent user access to resources such as application programs 644. Generally, shell 640 is a program that provides an interpreter and an interface between the user and the operating system. More specifically, shell 640 executes commands that are entered into a command line user interface or from a file. Thus, shell 640, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 642) for processing. Note that while shell 640 is a text-based, line-oriented user interface, the present disclosure will equally well support other user interface modes, such as graphical, voice, gestural, etc.

As depicted, OS 638 also includes kernel 642, which includes lower levels of functionality for OS 638, including providing essential services required by other parts of OS 638 and application programs 644, including memory management, process and task management, disk management, and mouse and keyboard management.

Application programs 644 include a renderer, shown in exemplary manner as a browser 646. Browser 646 includes program modules and instructions enabling a world wide web (WWW) client (i.e., computer 602) to send and receive network messages to the Internet using hypertext transfer protocol (HTTP) messaging, thus enabling communication with software deploying server 650 and other described computer systems.

Application programs 644 also include a human resource allocation program (HRAP) 648, which, when executed, performs some or all of the processes described in FIGS. 1-5 and 7-8. In one embodiment, HRAP 648 is downloadable from software deploying server 650 in an on-demand basis, such that units of code are downloaded only when needed. In another embodiment, some or all of the processes executed by HRAP 648 are performed by software deploying server 650 itself, thus minimizing the use of resources within computer 602.

Resource requesting computer 652 may be affiliated with one or more particular work areas within an enterprise or a project. Similarly, resource availability computer 652 may be affiliated with one or more particular work areas within an enterprise or a project. Utilizing the methodology described herein, resources can be reallocated from an area associated with resource availability computer 652 to another area associated with resource requesting computer 652, while contemplating ramp-up indexes, affinity indexes, priorities, etc. described herein.

The hardware elements depicted in computer 602 are not intended to be exhaustive, but rather are representative to highlight essential components required by the present disclosure. For instance, computer 602 may include alternate memory storage devices such as magnetic cassettes, digital versatile disks (DVDs), Bernoulli cartridges, and the like. These and other variations are intended to be within the spirit and scope of the present disclosure.

Figure 7:
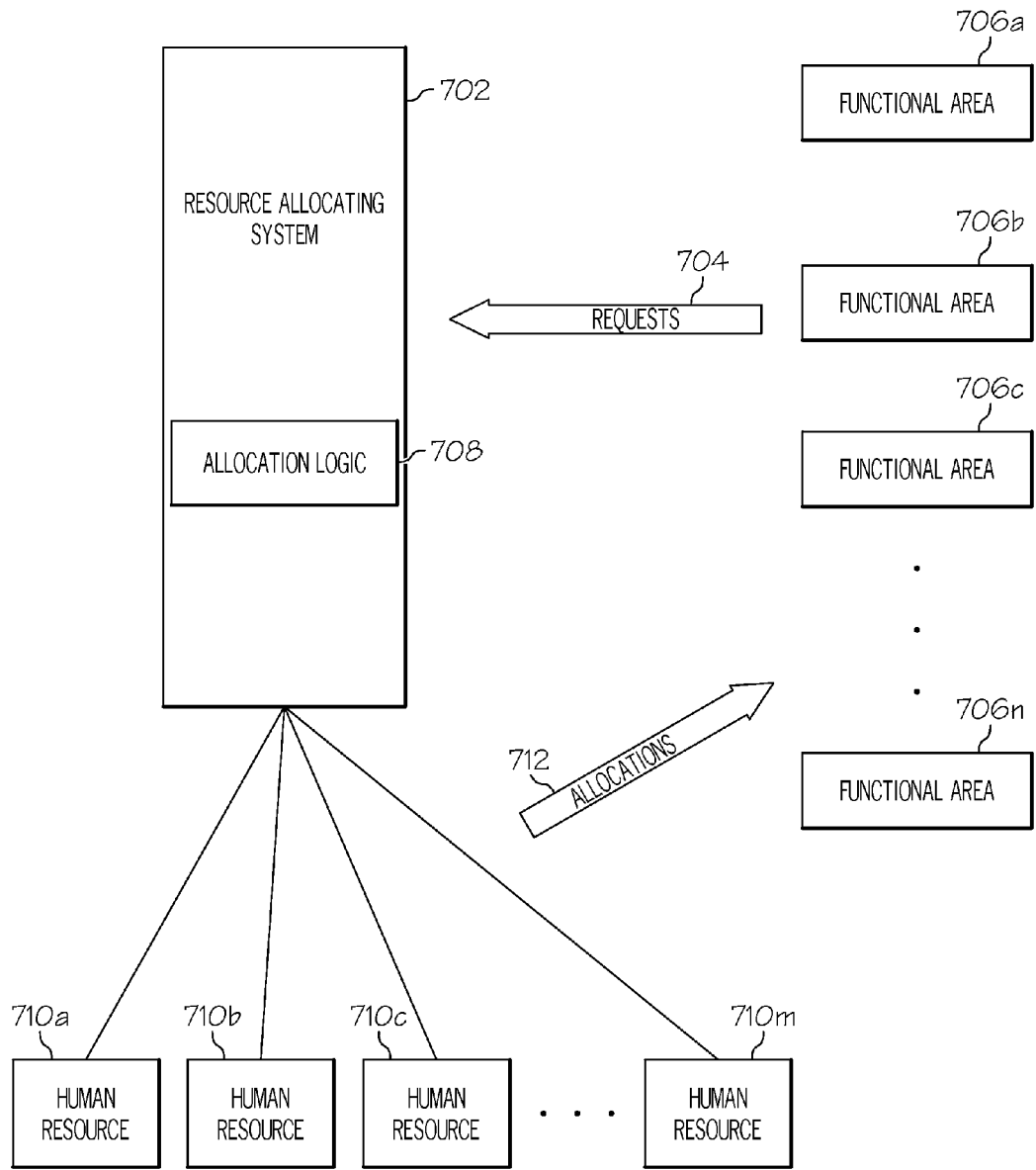
FIG. 7 depicts resources being allocated/reallocated to different activities areas within a software factory.

Referring now to FIG. 7, a relationship among a resource allocating system 702, multiple functional areas 706a-n (where "n" is an integer), and multiple human resources 710a-m (where "m" is an integer) is presented. In one embodiment, resource allocating system 702 can be some or all of computer 602 shown in FIG. 6. Functional areas 706a-n can communicate with resource allocating system 702 via a resource requesting computer, such as resource requesting computer 652 shown in FIG. 6. The existence of human resources 710a-m, or even the human resources 710a-m themselves, can be made known by a resource computer such as resource availability computer 654 shown in FIG. 6. As depicted, resource allocating system 702 utilizes allocation logic 708 (e.g., HRAP 648 shown in FIG. 6) to receive requests 704 for resources from functional areas 706a-n. In a manner described herein, these requests 704 may ultimately result in human resource allocations 712, which allocations are also under the control and direction of allocation logic 708.

Resource management and scheduling, including the human resource allocation described in FIG. 7, may utilize a constraint minimization problem, such as that depicted in Formula (1), where x* as an array with M elements-number of workers represents an optimal use of human resources:

$$x^* = \operatorname*{argmin}_{c_k(x) \geq 0} f(x) \quad \text{Formula (1)}$$

where $x_i$ is the decision vector for schedule of the $i^{th}$ worker, $f$ is the objective function (that may be lateness, penalty, etc.), and $c_k$ is the $k^{th}$ scheduling constraint (that for instance enforces all personnel to have a free schedule after a given time, etc.). The present disclosure presents a system and computer implemented method for optimized scheduling when the complexity of the service being provided by a set of human resources passes a predefined threshold. This predefined threshold may be related to an estimated achievable service level agreement (SLA).

Thus, in one embodiment of the present disclosure, a complexity of a work item is redefined as a two-component concept: complexity and intensity. In this new definition, a work item with high intensity takes a long time to be done, no matter whether a highly skilled worker does it or sufficiently skilled worker does it. A work item with high complexity, on the other hand, requires less time to be done if a highly skilled worker takes it on.

The present disclosure also defines a non-binary continuous proficiency level for each worker in his or her corresponding available skill set. These proficiency levels directly affect the needed time for a work item based on its complexity. However, they only affect the required time based on the intensity if the proficiency level is below a threshold for that work item.

Using these definitions, an N array is used to represent the decisions required for scheduling work items by reformulating the scheduling Formula (1) as Formula (2):

$$(x^*, y^*) = \operatorname*{argmin}_{c_k(x,y,Sx,Cy,Iy,Ity) \geq 0} f(x, y) \quad \text{Formula (2)}$$

where $x_i$ is the decision vector for schedule of the $i^{th}$ worker, $y_j$ is the decision vector for schedule of the $j^{th}$ work item, $f$ is the objective function (that may be lateness, penalty, etc.), and $c_k$ is the $k^{th}$ scheduling constraint. Note that once either of x or y is known, the other can be directly calculated. We are showing both here for convenience only. The matrices $S_x$, $C_y$ and $I_y$ hold the information about workers' skills, work items' complexity and work items' intensity, respectively. The matrix $I_{ty}$ holds the information about the work items' intensity threshold.

In one embodiment, a dynamic adaptive model is built by running and solving another optimization problem periodically (i.e. after each set of work items is finished, e.g. every week), in order to optimize the scheduling solution derived from Formula (2). In one embodiment, the dynamic adaptive model is based on Formula (3):

$$(Sx(t), Cy(t), Iy(t), Ity(t)) = \operatorname*{argmin}_{\substack{|Sx(t)-Sx(t-1)| \leq \Delta Sx \\ |Cy(t)-Cy(t-1)| \leq \Delta Cy \\ |Iy(t)-Iy(t-1)| \leq \Delta Iy \\ |Ity(t)-Ity(t-1)| \leq \Delta Ity}} \sum_{\tau=0}^{t-1} w_\tau \left[ \begin{array}{c} f(x(\tau), y(\tau)) - \\ \sum_i c_i(x(\tau), y(\tau), Sx(t), Cy(t), Iy(t), Ity(t)) \end{array} \right] \quad \text{Formula (3)}$$

where ΔX (i.e., ΔSx, ΔCy, ΔIy, ΔIty) represents the allowable change in the value of matrix X in one time period (e.g. one week), t represents the time for the next scheduling run (i.e. in the future), and $w_\tau$ is the fading factor and allows for managing the effect of time. Formula (3) essentially adjusts the estimate of the properties of the workers and work items with the passage of time.

Figure 8:
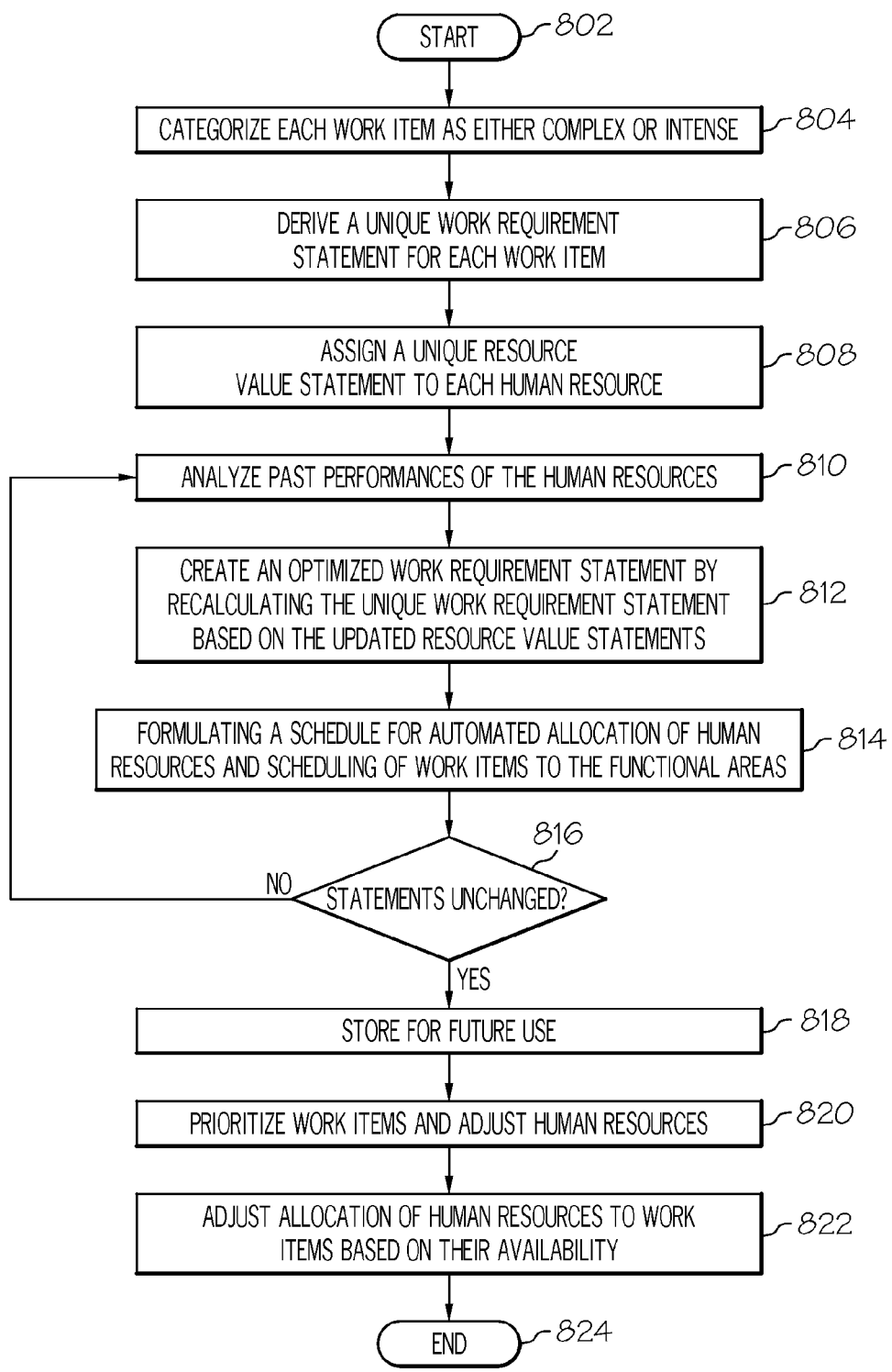
FIG. 8 is a high-level flow chart of one or more steps executed by a processor to allocate resources to one or more functional areas of an enterprise activity environment.

With reference now to FIG. 8, a high level flow chart of steps taken to automatically allocate human resources to functional areas of an enterprise activity environment and to schedule work items to the functional areas is presented. After initiator block 802, each work item from a group of work items is categorized as either complex or intense (block 804). That is, completion time for executing a complex work item is based on skill sets of available human resources matching required skill sets for the complex work item. However, completion time for executing an intense work item is based on a quantity of available human resources, regardless of their skill levels. As described in block 806, a unique work requirement statement is derived for each work item based on whether each work item is complex or intense. Thus, a unique work requirement statement for a complex work item is skill-set dependent, while the unique work requirement statement for an intense work item is skill-set neutral. That is, an intense work item has a work requirement statement that only describes how many workers are needed, without regard to their expertise. For example, an intense work item may only involve unskilled steps, such as packing finished products into boxes, etc. If these steps can be quickly taught to any worker, then there is no need for experienced box packers.

As described in block 808, a unique resource value statement is assigned to each human resource from multiple human resources. This unique resource value statement describes all skills held by each human resource based on a knowledge set and a proficiency level set of each human resource. This knowledge set and proficiency level can be based on scores from skill tests, education levels, certifications, etc. However, these sources of information may not tell the complete story about a worker. That is, a worker may test well on paper, but may not be effective when performing a particular job. Therefore, past performances of the human resources (workers) can be compared against completed work items in order to adjust the unique resource value statement, thereby creating updated human resource value statements for the human resources (block 810).

As described in block 812, an optimized work requirement statement is then created by recalculating the unique work requirement statement for each work item based on the updated resource value statements for the human resources. That is, an original work requirement statement may have called for a particular group of workers that collectively hold certain skill sets and/or are available in a certain quantity (e.g., 20 workers). However, if an analysis of the available skill sets/workers reveals that fewer or more skill sets/workers are available than originally thought to be needed for a work item, then the original unique work requirement statement may be modified (into the optimized work requirement statement), such that available skill sets/workers are used to their full capacity. As described in block 814, a schedule for automated allocation of human resources to functional areas of an enterprise activity environment and scheduling of work items to the functional areas is then formulated based on the optimized requirement statement for each work item in the group of work items.

With reference now to query block 816, the optimized requirement statement and the updated resource value statements may change during the execution of the group of work items. If so, then these statements will be updated using the processes described in blocks 810-814. However, if these statements remain unchanged throughout the execution of the group of work items, then they are stored in a database for use in formulating another schedule of automated allocation of human resources and scheduling of work items as applied to a new group of work items (block 818).

With reference now to blocks 820 and 822, work items and/or human resources can be prioritized and adjusted. For example, work items can be prioritized, such that a preferred work item is given preferential allocation of human resources to work on that preferred work item. In another embodiment, multi-level human resources (workers) are categorized according to their respective skill levels. A determination is made as to how many workers are available in each skill level, and the workers are then allocated to the work items based on their skill levels/availability. Thus, the priority of a work item is based not on a static criteria, but rather on the availability of requisite workers. The process ends at terminator block 824.

Note that in one embodiment of the present disclosure, the process described in FIG. 8 is applied to use with the software factory described above. That is, the enterprise activity environment is a software factory that utilizes pooled human resources to produce software application development and maintenance. In this embodiment, the computer implemented method described in FIG. 8 assigns a skill level to each skill set of a human resource from the pooled human resources, and a processor then formulates the schedule for executing the group of work items based on the optimized requirement statement for each work item in the group of work items.

In another embodiment of the present disclosure, the enterprise activity environment is a physical factory (e.g., having operations in a physical building), such that the group of work items produces a physical tangible product (e.g., a car, a computer, etc.).

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer implemented method for automated allocation of human resources to functional areas of an enterprise activity environment and scheduling of work items to the functional areas, wherein the enterprise activity environment is a software factory that utilizes pooled human resources to produce software application development and maintenance, and wherein the computer implemented method comprises:
    a processor categorizing each work item from a group of work items as either complex or intense, wherein completion time for executing a complex work item is based on skill sets of available human resources matching required skill sets for the complex work item, and wherein completion time for executing an intense work item is based on a quantity of available human resources regardless of their skill levels;
    the processor deriving a unique work requirement statement for said each work item based on whether each work item is complex or intense, wherein the unique work requirement statement for a complex work item is skill-set dependent, and wherein the unique work requirement statement for an intense work item is skill-set neutral;
    the processor assigning a unique resource value statement to each human resource from multiple human resources, wherein the unique resource value statement describes all skills held by each human resource based on a knowledge set and a proficiency level set of each human resource;
    the processor analyzing past performances of the human resources against completed work items in order to adjust the unique resource value statement, thereby creating updated human resource value statements for the human resources;
    the processor creating an optimized work requirement statement by recalculating the unique work requirement statement for each work item based on the updated human resource value statements for the human resources and on a current availability of the skill sets of available human resources that match the required skill sets for the complex work item;
    the processor formulating a schedule for automated allocation of human resources to functional areas of an enterprise activity environment and scheduling of work items to the functional areas based on the optimized work requirement statement for each work item in the group of work items; and
    utilizing said schedule for automated allocation of human resources and said scheduling of work items when creating a customized deliverable unit of software in the software factory, wherein the customized deliverable unit of software is created by assembling work packets in an assembly line in the software factory, wherein each work packet constitutes a contractual agreement that governs a relationship among a design center, a software factory governance board, a software factory operations unit, and the assembly line in the software factory, wherein the design center breaks a software project into major functional areas, wherein the software factory governance board determines whether or not to allow the software factory to accept the software project, wherein the software factory operations unit dispatches the software project to the assembly line, wherein the assembly line receives and executes work packets that are specified by the design center to create the customized deliverable unit of software, wherein said each work packet further comprises exit criteria, and wherein the exit criteria comprises a checklist for returning said each work packet from the assembly line to the software factory operations unit and for returning the customized deliverable unit of software from a customer to the software factory.

2. The computer implemented method of claim 1, further comprising:
    the processor, in response to the optimized work requirement statement and the updated human resource value statements remaining unchanged until execution of the group of work items is completed, storing the optimized work requirement statement and the updated human resource value statements in a database; and
    the processor utilizing the optimized work requirement statement and the updated human resource value statements to formulate another schedule for automated allocation of human resources and scheduling of work items as applied to a new group of work items.

3. The computer implemented method of claim 1, further comprising
    the processor assigning a skill level to each skill set of a human resource from the pooled human resources; and
    the processor formulating the schedule for executing the group of work items based on the optimized work requirement statement for each work item in the group of work items.

4. The computer implemented method of claim 1, wherein the enterprise activity environment is a physical factory, and wherein the group of work items produces a physical tangible product.

5. The computer implemented method of claim 1, further comprising:
    the processor prioritizing the work items; and
    the processor adjusting allocation of human resources to the work items based on work item prioritization.

6. The computer implemented method of claim 1, further comprising:
    the processor determining an availability of multi-level human resources, wherein the multi-level human resources are categorized according to their respective skill levels; and
    the processor adjusting allocation of human resources to the work items based on a determined availability of the multi-level human resources.

7. A computer program product for automated allocation of human resources to functional areas of an enterprise activity environment and scheduling of work items to the functional areas, wherein the enterprise activity environment is a software factory that utilizes pooled human resources to produce software application development and maintenance, and wherein the computer program product comprises:
  a computer readable storage media;
  first program instructions to categorize each work item from a group of work items as either complex or intense, wherein completion time for executing a complex work item is based on skill sets of available human resources matching required skill sets for the complex work item, and wherein completion time for executing an intense work item is based on a quantity of available human resources regardless of their skill levels;
  second program instructions to derive a unique work requirement statement for said each work item based on whether each work item is complex or intense, wherein the unique work requirement statement for a complex work item is skill-set dependent, and wherein the unique work requirement statement for an intense work item is skill-set neutral;
  third program instructions to assign a unique resource value statement to each human resource from multiple human resources, wherein the unique resource value statement describes all skills held by each human resource based on a knowledge set and a proficiency level set of each human resource;
  fourth program instructions to analyze past performances of the human resources against completed work items in order to adjust the unique resource value statement, thereby creating updated human resource value statements for the human resources;
  fifth program instructions to create an optimized work requirement statement by recalculating the unique work requirement statement for each work item based on the updated human resource value statements for the human resources and on a current availability of the skill sets of available human resources that match the required skill sets for the complex work item;
  sixth program instructions to formulate a schedule for automated allocation of human resources to functional areas of an enterprise activity environment and scheduling of work items to the functional areas based on the optimized work requirement statement for each work item in the group of work items; and
  seventh program instructions to utilize said schedule for automated allocation of human resources and said scheduling of work items when creating a customized deliverable unit of software in the software factory, wherein the customized deliverable unit of software is created by assembling work packets in an assembly line in the software factory, wherein each work packet constitutes a contractual agreement that governs a relationship among a design center, a software factory governance board, a software factory operations unit, and the assembly line in the software factory, wherein the design center breaks a software project into major functional areas, wherein the software factory governance board determines whether or not to allow the software factory to accept the software project, wherein the software factory operations unit dispatches the software project to the assembly line, wherein the assembly line receives and executes work packets that are specified by the design center to create the customized deliverable unit of software, wherein said each work packet further comprises exit criteria, and wherein the exit criteria comprises a checklist for returning said each work packet from the assembly line to the software factory operations unit and for returning the customized deliverable unit of software from a customer to the software factory, and wherein the first, second, third, fourth, fifth, sixth, and seventh program instructions are stored on the computer readable storage media.

8. The computer program product of claim 7, further comprising:
  eighth program instructions to, in response to the optimized work requirement statement and the updated human resource value statements remaining unchanged until execution of the group of work items is completed, store the optimized work requirement statement and the updated human resource value statements in a database; and
  ninth program instructions to utilize the optimized work requirement statement and the updated human resource value statements to formulate another schedule for automated allocation of human resources and scheduling of work items as applied to a new group of work items, and wherein the eighth and ninth program instructions are stored on the computer readable storage media.

9. The computer program product of claim 7, wherein the computer program product further comprises:
  eighth program instructions to assign a skill level to each skill set of a human resource from the pooled human resources; and
  ninth program instructions to formulate the schedule for executing the group of work items based on the optimized work requirement statement for each work item in the group of work items, and wherein the eighth and ninth program instructions are stored on the computer readable storage media.

10. The computer program product of claim 7, wherein the enterprise activity environment is a physical factory, and wherein the group of work items produces a physical tangible product.

11. The computer program product of claim 7, further comprising:
  eighth program instructions to prioritize the work items; and
  ninth program instructions to adjust allocation of human resources to the work items based on work item prioritization, and wherein the eighth and ninth program instructions are stored on the computer readable storage media.

12. The computer program product of claim 7, further comprising:
  eighth program instructions to determine an availability of multi-level human resources, wherein the multi-level human resources are categorized according to their respective skill levels; and
  ninth program instructions to adjust allocation of human resources to the work items based on a determined availability of the multi-level human resources, and wherein the eighth and ninth program instructions are stored on the computer readable storage media.

13. A computer system comprising:
  a central processing unit (CPU), a computer readable memory, and a computer readable storage media;
  first program instructions to categorize each work item from a group of work items as either complex or intense, wherein completion time for executing a complex work item is based on skill sets of available human resources matching required skill sets for the complex work item, and wherein completion time for executing an intense work item is based on a quantity of available human resources regardless of their skill levels;

second program instructions to derive a unique work requirement statement for said each work item based on whether each work item is complex or intense, wherein the unique work requirement statement for a complex work item is skill-set dependent, and wherein the unique work requirement statement for an intense work item is skill-set neutral;

third program instructions to assign a unique resource value statement to each human resource from multiple human resources, wherein the unique resource value statement describes all skills held by each human resource based on a knowledge set and a proficiency level set of each human resource;

fourth program instructions to analyze past performances of the human resources against completed work items in order to adjust the unique resource value statement, thereby creating updated human resource value statements for the human resources;

fifth program instructions to create an optimized work requirement statement by recalculating the unique work requirement statement for each work item based on the updated human resource value statements for the human resources and on a current availability of the skill sets of available human resources that match the required skill sets for the complex work item;

sixth program instructions to formulate a schedule for automated allocation of human resources to functional areas of an enterprise activity environment and scheduling of work items to the functional areas based on the optimized work requirement statement for each work item in the group of work items; and seventh program instructions to utilize said schedule for automated allocation of human resources and said scheduling of work items when creating a customized deliverable unit of software in the software factory, wherein the customized deliverable unit of software is created by assembling work packets in an assembly line in the software factory, wherein each work packet constitutes a contractual agreement that governs a relationship among a design center, a software factory governance board, a software factory operations unit, and the assembly line in the software factory, wherein the design center breaks a software project into major functional areas, wherein the software factory governance board determines whether or not to allow the software factory to accept the software project, wherein the software factory operations unit dispatches the software project to the assembly line, wherein the assembly line receives and executes work packets that are specified by the design center to create the customized deliverable unit of software, wherein said each work packet further comprises exit criteria, and wherein the exit criteria comprises a checklist for returning said each work packet from the assembly line to the software factory operations unit and for returning the customized deliverable unit of software from a customer to the software factory, and wherein the first, second, third, fourth, fifth, sixth, and seventh program instructions are stored on the computer readable storage media for execution by the CPU via the computer readable memory.

14. The computer system of claim 13, further comprising:
eighth program instructions to, in response to the optimized work requirement statement and the updated human resource value statements remaining unchanged until execution of the group of work items is completed, store the optimized work requirement statement and the updated human resource value statements in a database; and ninth program instructions to utilize the optimized work requirement statement and the updated human resource value statements to formulate another schedule for automated allocation of human resources and scheduling of work items as applied to a new group of work items, and wherein the eighth and ninth program instructions are stored on the computer readable storage media for execution by the CPU via the computer readable memory.

15. The computer system of claim 13, wherein the computer system further comprises:
eighth program instructions to assign a skill level to each skill set of a human resource from the pooled human resources; and ninth program instructions to formulate the schedule for executing the group of work items based on the optimized work requirement statement for each work item in the group of work items, and wherein the eighth and ninth program instructions are stored on the computer readable storage media for execution by the CPU via the computer readable memory.

16. The computer system of claim 13, wherein the enterprise activity environment is a physical factory, and wherein the group of work items produces a physical tangible product.

17. The computer system of claim 13, further comprising:
eighth program instructions to prioritize the work items; and ninth program instructions to adjust allocation of human resources to the work items based on work item prioritization, and wherein the eighth and ninth program instructions are stored on the computer readable storage media for execution by the CPU via the computer readable memory.

18. The computer system of claim 13, further comprising:
eighth program instructions to determine an availability of multi-level human resources, wherein the multi-level human resources are categorized according to their respective skill levels; and ninth program instructions to adjust allocation of human resources to the work items based on a determined availability of the multi-level human resources, and wherein the eighth and ninth program instructions are stored on the computer readable storage media for execution by the CPU via the computer readable memory.

* * * * *